INDICATOR AND CONTROL APPARATUS FOR USE WITH INFORMATION RECORDING DEVICE

Filed May 16, 1968 4 Sheets-Sheet 1

INVENTORS
DIXON RIGGS
DAVID T. PEERSON

INVENTORS
DIXON RIGGS
DAVID T. PEERSON

INVENTORS
DIXON RIGGS
DAVID T. PEERSON

INVENTORS
DIXON RIGGS
DAVID T. PEERSON

United States Patent Office 3,558,226

Patented Jan. 26, 1971

3,558,226

INDICATOR AND CONTROL APPARATUS FOR USE WITH INFORMATION RECORDING DEVICE

Dixon Riggs and David T. Peerson, New York, N.Y., assignors to Eastman Kodak Company, Rochester, N.Y., a corporation of New Jersey Filed May 16, 1968, Ser. No. 729,769
Int. Cl. G03b 27/32
U.S. Cl. 355—54 42 Claims

ABSTRACT OF THE DISCLOSURE

An indicating and control apparatus for use with a microfilm camera of the type designed for producing an extended film having multiple successive microfilm image frames and occasional blank frames, the film subsequently to be separated into strips of film having a standardized number of frames so that such strips may be used to form rows of a microfiche card. The apparatus includes a monitor system which indicates to the operator, the frame and row order required by the microfiche card format as he operates the camera and control system which automatically actuates certain filming operations. The apparatus may be adjusted to accommodate a variety of formats of microfiche cards having different numbers of rows and frames per row, including or omitting title rows.

BACKGROUND OF THE INVENTION

In the art of information storage and retrieval, one commonly used information element is a microfiche or film card. One procedure practiced in forming such elements is to photograph successive records on successive image frames of an extended length of film in unit groups of a standardized number of images, the unit groups being separated by separation frames for later separation of the groups. Such a film is shown in FIG. 1. The film is then cut through the separation frames into unit strips having the standardized number of image frames or blank frames in place of image frames where for some reason no image is desired. Such unit strips are then arranged in parallel rows to form a "stripped up microfiche master" (FIG. 2) which is then photographed to form a second film (FIG. 3), with multiple images in multiple rows. This second film is called a microfiche card. Various formats of microfiche cards are in common use and they vary in the number of image rows and in the number of images or blank frames per row. It is often desirable that a row be left blank at the top of the microfiche cards for the addition of identifying titles. The format of the microfiche card to be used depends of course on the desires of the particular user of the microfilm apparatus. A typical such microfiche card is shown in FIG. 3.

Particularly where a large number of documentary or other records are to be processed, it is difficult for the microfilm camera operator as he makes the original extended film to keep in mind the unit rows and the images or blank frames per row as they will be related to the desired order of rows and images or blank frames per row on the microfiche card which he will subsequently form. It is particularly difficult where the operator may wish to change from one microfiche card format to another. The difficulty becomes greater when errors are made such as when some one document is erroneously photographed twice or out of proper order. The attempt to correct the error by rephotographing the documents and indicating the erroneous images to be discarded obviously complicates the task of keeping in mind the proper row and frame order to be followed subsequently in forming the microfiche card.

Various devices have been devised to aid the operator with this problem. Of course he may simply keep a written record as he proceeds with his photographing of the documentary records. This of course is inefficient and clumsy. Devices have been provided which present the operator with a rectangular configuration of signal lights in rows corresponding to the rows and images or blank frames per row of the microfiche card which he will subsequently form. Such devices have notably shortcomings such as that it is difficult to correct for errors and that a separate such device must be provided for each format of microfiche card desired. Other devices have been provided but they too have various shortcomings.

It is therefore an object of the present invention to provide an improved indicating and control apparatus for use in recording documents in microfiche format.

Another object of the invention is to provide the microfilm camera operator, as he records film for a microfiche information element, with an improved means for keeping in mind the unit rows and images or blank frames per row as they will be related to the desired order of rows and images or blank frames per row on the microfiche card which he must subsequently form. This will include providing him with means for adjusting the apparatus to conform to the various common formats of microfiche cards desired by the individual customer. It will also provide him with means for correcting his mistakes as he photographs a large number of documents. Further, it will provide means for automatically controlling certain recording medium advance functions.

SUMMARY OF THE INVENTION

In general, the invention comprises an indicating and control system, actuated by successive frame cycle actuations of the camera, which visually indicates to the operator the row and frame within the row with which he is working at any particular moment as related to the particular microfiche card format he wishes to use. Means are provided for presetting the system to operate with different numbers of rows, images per row, and frames per row as required by different microfiche card formats. Means are also provided to cause the system to operate automatically to a large extent so as to simplify the operator's tasks, for example, the system automatically shifts from frame to frame, from row to row, automatically resets for successive microfiche cards, and automatically provides blank frames where required. Other task simplifying functions are provided in the system.

While the invention is described herein as used to indicate and control recording on strips for forming "stripped up" microfiche masters, it will be appreciated by those skilled in the art that the present invention can be utilized to similar advantage in applications wherein images are recorded in microfiche format directly on a sheet of recording medium as, e.g., by moving the sheet frame by frame and row by row past the recording station.

DRAWINGS

DESCRIPTION OF PREFERRED EMBODIMENT

Film and microfiche

Figure 1:
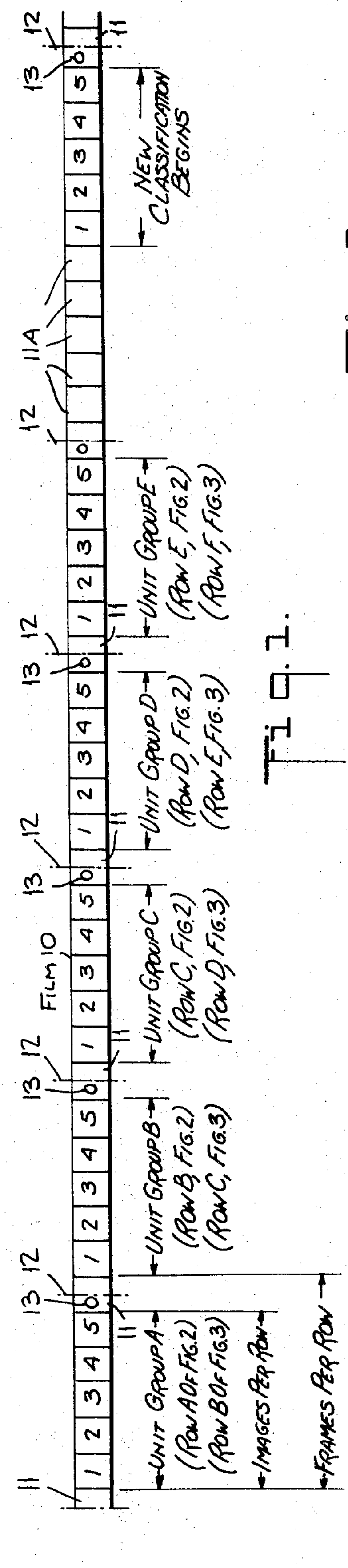
FIG. 1 shows an extended length of film showing successive image frames upon which records have been photographed for frames left blank where desired.
Figure 3:
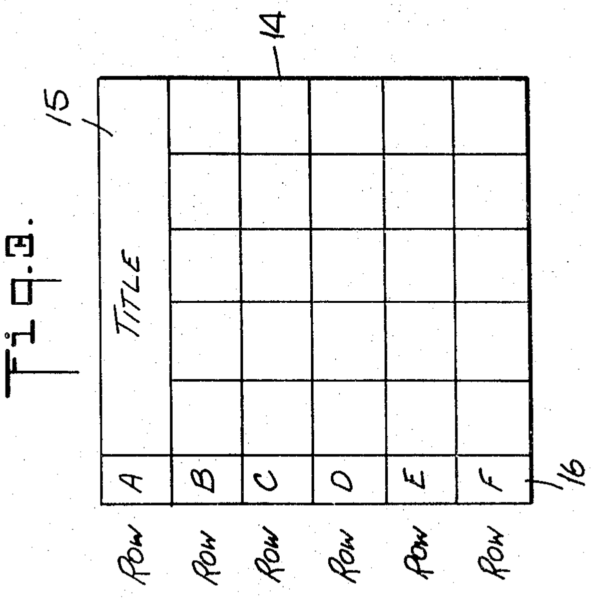
FIG. 3 illustrates a typical microfiche card.
Figure 4:
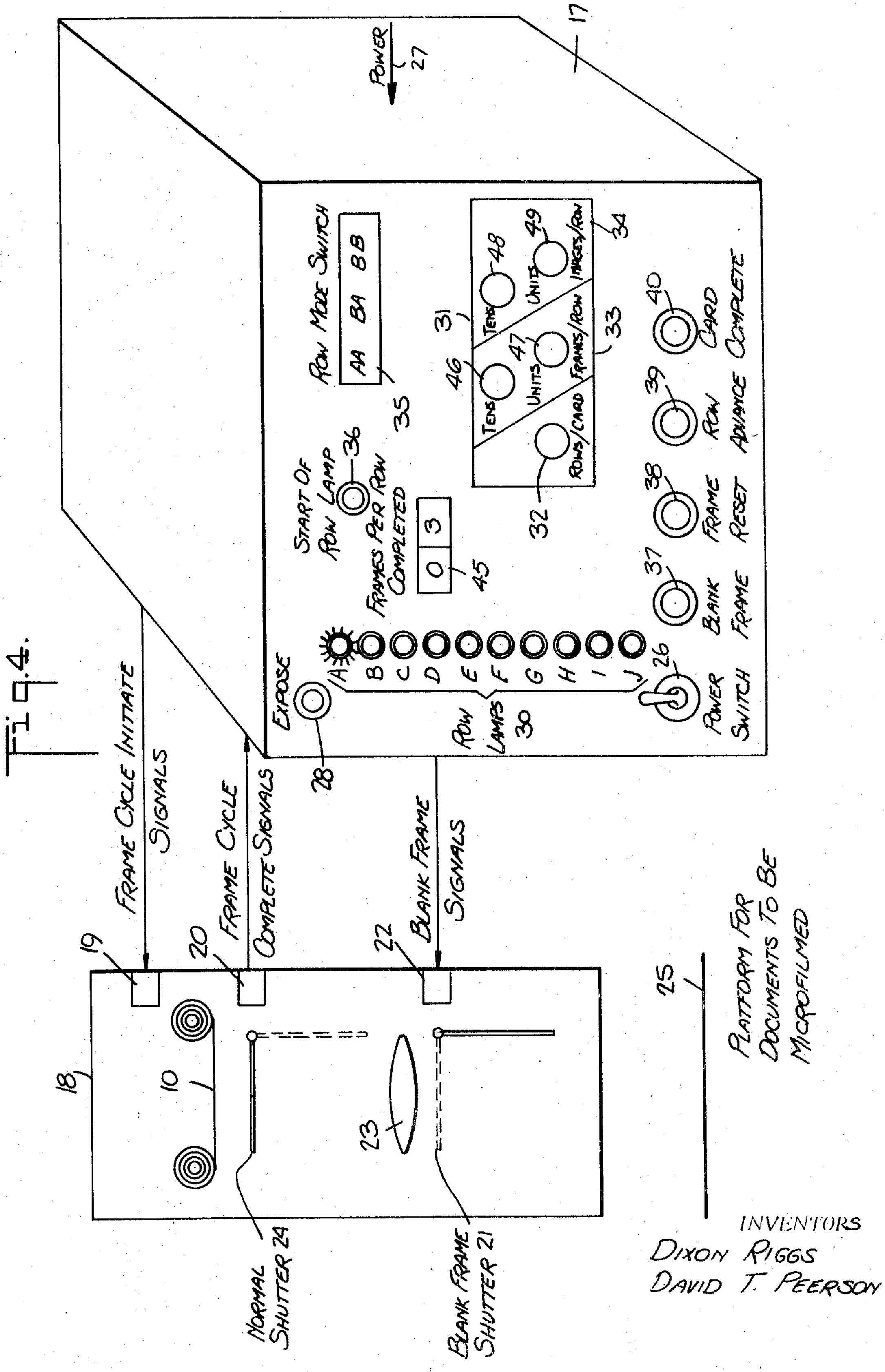
FIG. 4 is a view of a preferred embodiment of the apparatus of the invention showing the microfilm camera and its associated monitoring equipment as the apparatus would appear in actual use.

To facilitate the understanding of the invention, the objective of the microfilm operator should first be well unstood. As previously indicated, the operator first photographs a succession of documentary or other type of records on successive frames of an extended length of film 10 (FIG. 1), by means of a conventional microfilm camera (FIG. 4). Each document thus becomes an image on one frame of the film 10. For the purpose of subsequently forming a microfiche card (FIG. 3), the frames of the film 10 of FIG. 1 are grouped in unit groups A, B, C, D, E, which may be cut apart. Thus FIG. 1 shows successive unit groups A, B, C, D, E, each group comprising frames 1, 2, 3, 4, 5, containing the image of successive photographed documents. Between the groups A, B, C, D, E, are separation frames 11 intentionally left unused photographically by the operator because he will wish to use these separation frames for separating the unit groups A, B, C, D, E, by cutting along the cutting lines 12, when he wishes to form the microfiche cards. There may be more or less image frames than five per unit group, and more or less unit groups than five depending on the format of the desired microfiche card in terms of the number of frames per row, rows per card, and presence or absence of a title row in the format. It may also be desirable to have more than one separation frame 11 between unit groups.

To form microfiche cards, the operator provides alignment holes 13 in the blank frames 11 and severs the film 10 into strips by cutting along lines 12. He then aligns the severed strips in parallel rows A, B, C, D, E, in a stripped up microfiche master as in FIG. 2 using holes 13 as a guide. He then photographs the FIG. 2 configuration excluding the portions of separation frames 11 to provide a new film called a microfiche card 14 as shown in FIG. 3. It will often be desirable to provide the microfiche card 14 with a top row 15 for identifying titles and a side portion 16 with row identifying letters A, B, C, D, E, F. The microfiche card 14 of FIG. 3 will be used in a suitable projector to project the documentary images in the various frames in enlarged form onto a suitable viewing screen.

Figure 2:
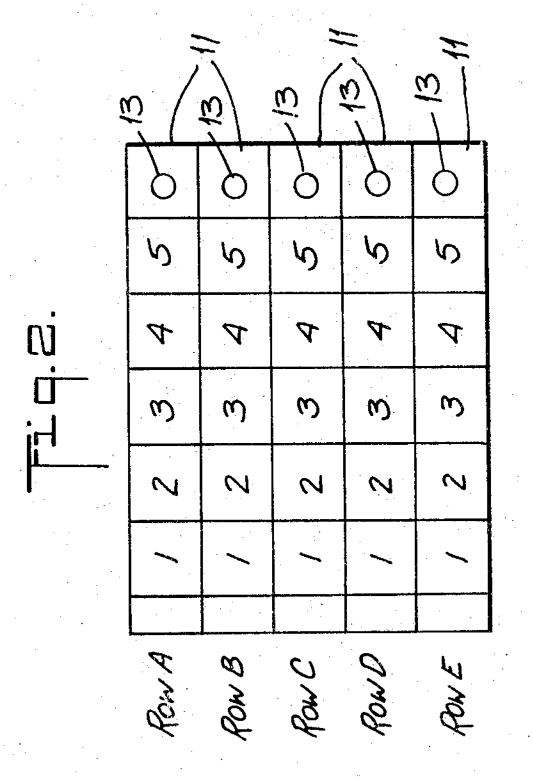
FIG. 2 illustrates the manner in which the film of FIG. 1 is cut into strips arranged in parallel rows to form a stripped up microfiche master prior to rephotographing to form a microfiche card.

The FIGS. 1 to 3 have illustrated the film and microfiche card processing to produce one microfiche card of 25 frames in five rows of five images per row. If there are more than 25 documents in a particular classification the process is continued on film 10 with additional groups A, B, C, D, E, and on additional microfiche cards. If the number of documents in the particular classification is insufficient to complete all the frames of the last microfiche card, the remaining frames are left bank. If a new classification of documents is to be processed, the operator may start anew on film 10, separating the new classification from the former classification by suitable means such as an extended series of separation frames 11A which may be blank to indicate the fact that a new classification has been started or which may photograph suitable identifying indicia to the same effect depending upon the desires of the particular user.

Microfiche cards in common use take many formats depending on the desires of the particular user. They vary in the number of rows of frames and in the number of frames and images per row. They may or may not have title row A. A given series of documents under some particular subject matter may be sufficiently numerous as to require a number of microfiche cards to be filed as a group, in which case the cards after the first ("lead" microfiche card) are designated "trailer" microfiche cards. In that event, it may be desirable to have a title row only on the lead card and none on the trailer cards. Or it may be desirable to have the title on the trailer cards as well as on the lead card.

It is therefore apparent that a monitor meeting the object of the invention, namely that it have universal application for a wide range of different microfiche card formats of users, must meet numerous conditions. For example, while the microfilm camera operator is photographing a multitude of documents to produce the extended film 10 of FIG. 1, he will wish to be able to set the monitor in the following ways to provide the following information or perform the following functions as he works along film 10.

(1) Set the monitor to conform to the number of documentary images per row for which a particular format of microfiche card is designed, for example, five images per row in the arrangement indicated by FIGS. 2 and 3. This setting is designated "images per row" hereinafter even though an occasional frame may be left blank.

(2) Set the monitor to conform to the total number of image frames, and separation frames per group in film 10 corresponding to the particular type of stripped microfiche master (FIG. 2) used, which means a total of six for FIGS. 1 and 2. This is designated "frames per row" hereinafter.

(3) Set the monitor to conform to the number of rows for which the particular type of microfiche card used is designed, for example, 6 rows for the microfiche card of FIG. 3 if a title row is used and 5 rows if a title row is not used. This setting is designated "rows per card" hereinafter.

(4) Provide an indicator of the unit group or row in which the operator is operating at any given moment.

(5) Provide an indicator of the total number of frames (image or blank) the operator has completed in the unit group or row in which he is operating at any given moment.

(6) Set the monitor for "Row Mode" meaning to set it so that upon completion of the unit groups and the separation frames (FIG. 1) corresponding to the completion of the last row of any microfiche card, the row indicator will return to an indication of the desired row with which the following trailer microfiche cards are to start. For example:

AA mode means there are no title rows and the row indicator should always return to an indication of row A (FIG. 3) upon completion of the unit groups for each microfiche card so that it is ready to start with row A for the trailer microfiche cards. In this case, the row A of FIG. 3 is used for image frames rather than a title.

BB mode means there is a title row for each microfiche card and so the indicator returns to row B upon completion of the unit groups corresponding to the last row of each microfiche card and is ready to start on row B of the next trailer card.

BA mode means there is a title row for the first or lead microfiche card but no title row on subsequent or trailer microfiche cards. Therefore, the first unit group on the lead microfiche card is to start on row B and subsequent unit groups corresponding to the first row of trailer microfiche cards are to start on row A.

(7) Separation frames, such as frames 11, or blank frames to complete a unit group, where the microfiche images end without completing that row, should be made automatically.

(8) Means should be provided whereby the operator may advance the rows indicator for various purposes such as resetting or corrections.

(9) Means should be provided whereby the operator may reset the frames indicator for various purposes such as corrections.

(10) Means should be provided to indicate to the operator that a unit group or row is about to start.

(11) Means should be provided to permit the operator to expose blank frames as desired.

(12) Means should be provided whereby when the operator has completed a given classification of documents without fully using all frames of a microfiche card, he may actuate a "card complete" control to cause the system to expose all remaining frames of that row in blank, and reset the monitor to begin a new classification on a new lead microfiche card.

FIG. 4

FIG. 4 depicts the system as it would appear in use. The monitor is incorporated in "black box" 17 while the camera apparatus is shown schematically at the left and comprises a camera 18 which includes a means 19 for initiating a frame cycle, i.e., the photographing of one frame and setting the camera for the next at the command of a Frame Cycle Initiate Signal from monitor 17; means 20, such as a suitable switch for creating a suitable electrical pulse as a Frame Cycle Complete Signal upon completion of each frame cycle to indicate frame cycle completion to the monitor 17; a blank frame shutter 21 for blocking the optical path for any one frame so that no image is made; and blank frame shutter control means 22, such as a solenoid, for actuating the blank frame shutter 21 at the command of Blank Frame Signals from monitor 17. Shutter 21 is normally in open position shown in solid line and upon actuation is moved to the dotted line position.

Otherwise, camera 18 includes the conventional means for mounting the film 10 (of FIG. 1) and moving it from frame to frame and exposing the frame through lens 23 upon actuation of the "barn door" shutter 24 to the dotted line position from its normally closed position shown in solid line. A platform 25 holds documents to be photographed. The camera is energized by a conventional 120 volt power source which is the source of power for the Frame Cycle Complete Signal. The source of power for the Blank Frame and Frame Cycle initiate Signals is in monitor 17.

Monitor 17 has power switch 26 for initiating its operation by connecting the system to power source 27, expose switch 28 for producing at the command of the operator a frame cycle initiate signal to actuate the camera 18 when the operator wishes to expose a frame. Upon completion of each exposure, a frame cycle complete signal is returned to monitor 17 and that causes the counter 45 to advance to indicate the number of frames which have been exposed in the unit group or row involved. The unit group or row involved is indicated by the ten indicator lamps 30. Thus, as shown, only lamp A is illuminated in the vertical series of lamps A to J, and counter 45 shows "3." This means that the operator is working in the first unit group or row A (FIGS. 1 to 3) and that he has used three frames. As the operator continues exposing frames or actuating the camera to produce blank frames, or as the system automatically produces blank frames as later explained, counter 45 counts the frames used per row up to the number of frames per row required by the particular stripped microfiche master format (FIG. 2) with which the operator is working and then shifts to zero count to prepare for the starting of the next group or row. At the same time, the frame counter 45 shifts a row counter to extinguish the row lamp for the group or row just completed and to illuminate the row lamp for the next row. This continues until the operator has worked the group or row corresponding to the last row of the particular microfiche card format with which he is working.

Frames per row counter 45 and row lamps 30 will not go beyond the number of frames per row nor beyond the number of rows for the particular microfiche card format being used. Neither will the operator be able to expose in any one row more than the number of images per row for the particular microfiche card format being used. This is because the operator will have set monitor 17 to produce those results by means of controls 31. Thus, assume the example of FIGS. 1 and 2 which assumes the use of a microfiche card having five rows A, B, C, D, and E; five images per row; and no title row. This means six frames per row because of the single separation frame 11. In that case the operator will have set controls 31 so that rows per card switch 32 indicates "5," frames per row control 33 (including switches 46 and 47) indicates "6," and images per row indicator 34 (including switches 48 and 49) indicates "5."

The operation of making and counting separation frame 11 will be automatic.

The purpose of row mode control switch 35 has been suggested above. The operator will have set this control for either AA, BA or BB mode of operation.

Start of row lamp 36 will automatically illuminate whenever a new group or row is about to begin but will be extinguished upon completion of the first frame cycle of the new group or row.

Should the operator wish at any time to make a blank frame he may press blank frame switch 37 which will develop a frame cycle initiate signal in means 19 of the camera and a blank frame signal in means 22 to actuate blank frame shutter 21.

Should the operator wish at any time to reset the frames counter 45 to zero, he may press frame reset switch 38.

Should the operator wish at any time to advance the rows he may press row advance switch 39 and the row lamps 30 will advance one row for each actuation of switch 39, until the rows per card setting is reached after which the next actuation returns the monitor to row A, or to row B depending upon row mode setting.

Should the operator find at any time that he has completed a given classification of documents before reaching the end of a microfiche card and wish to consider that card as complete, he may press card complete switch 40 in which case the system will complete that row as blanks and automatically reset the monitor for the beginning of a new microfiche card.

Figure 5:
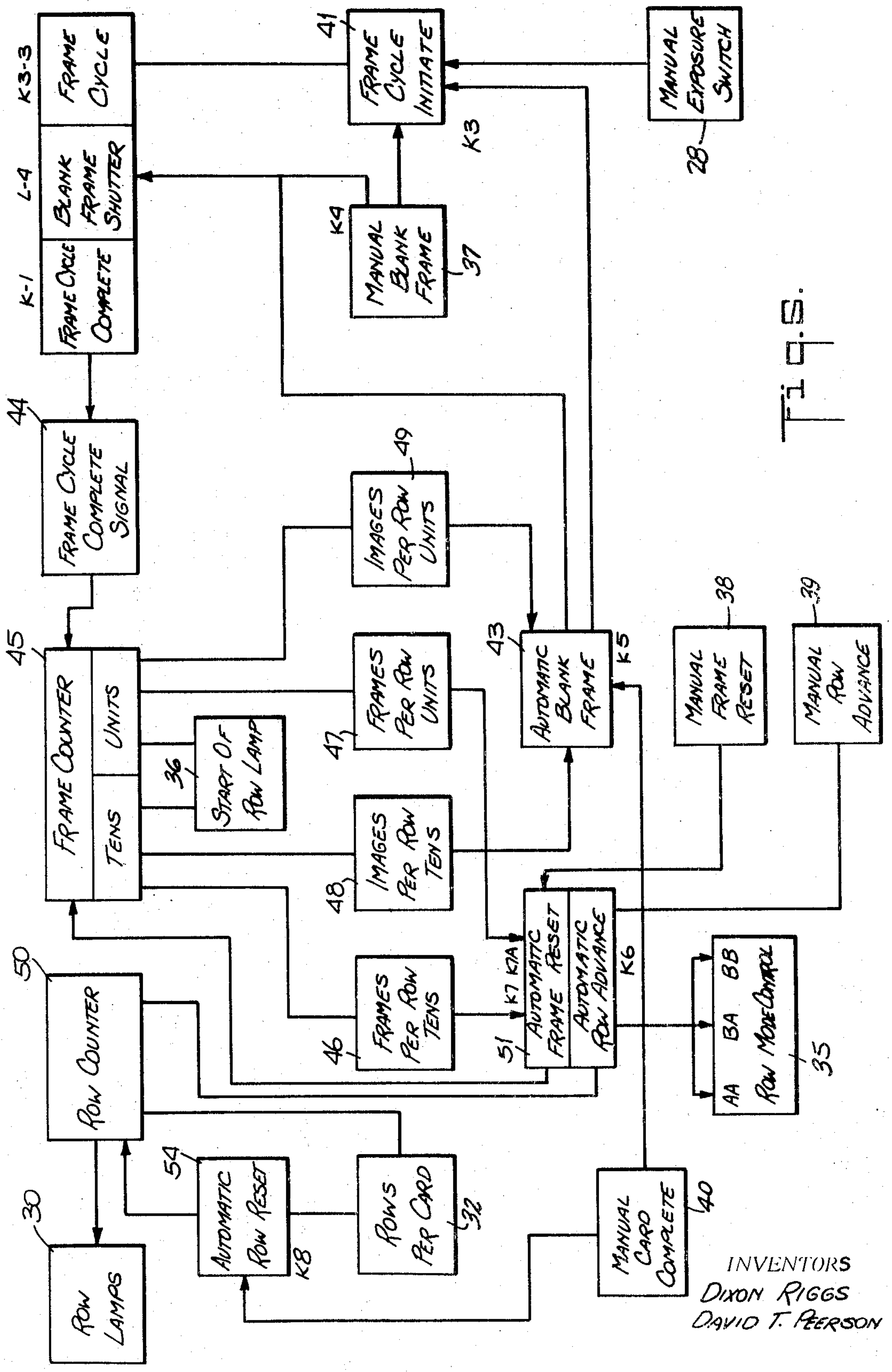
FIG. 5 is a logic diagram which will facilitate the understanding of the purpose and functioning of the apparatus of FIGS. 4 and 6.
Figure 6:
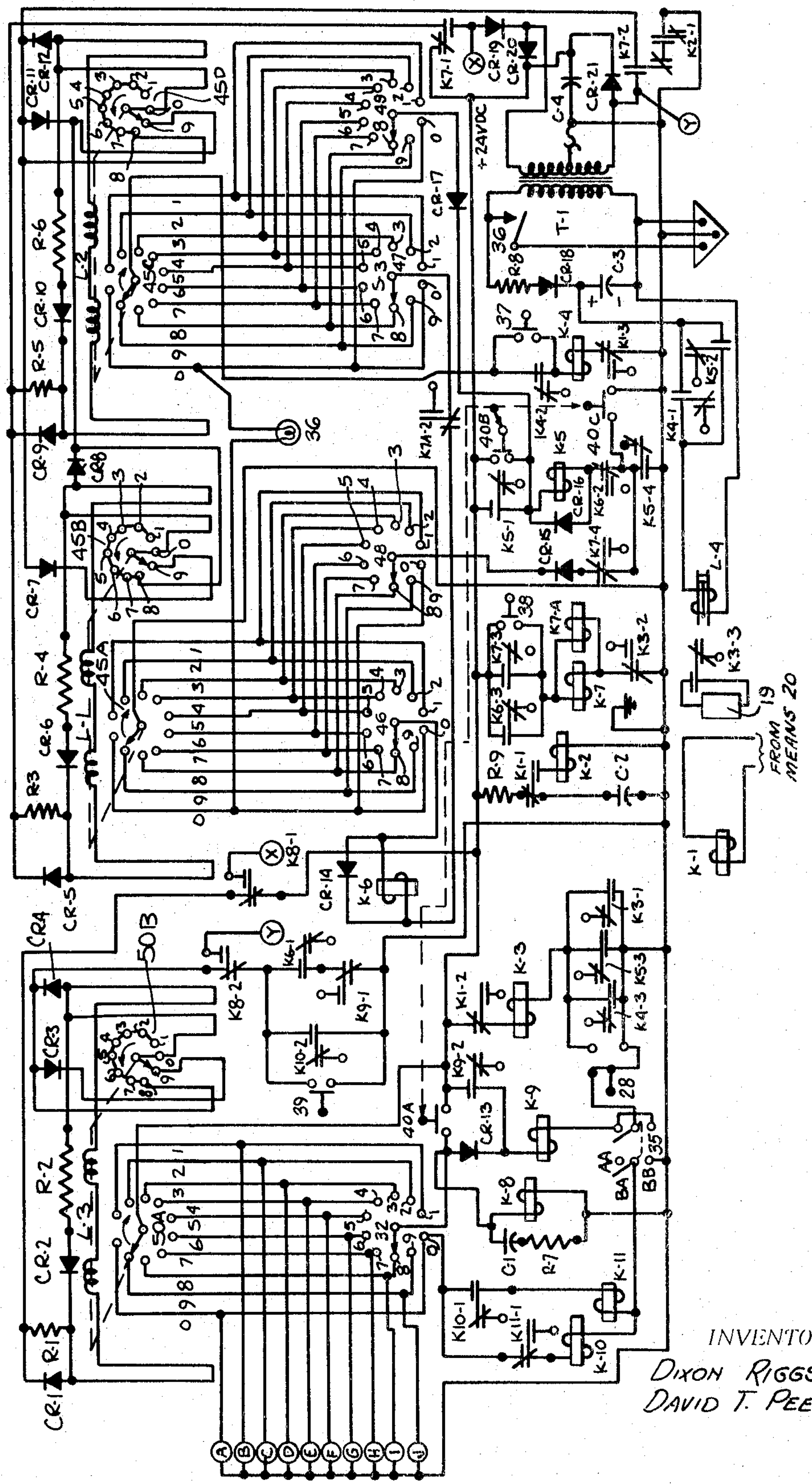
FIG. 6 is a practical circuit diagram of the apparatus of FIGS. 4 and 5.

The circuits within monitor 17 for bringing about all the foregoing actions are shown in FIG. 6. But before describing FIG. 6, the logic of its circuits will be outlined with reference to FIG. 5.

FIG. 5

In FIG. 5 the mechanisms and circuits of the system are indicated together with their functional interrelationships as follows:

FIG. 5 shows the frame cycle, blank frame shutter, and frame cycle complete functions. The frame cycle function includes the means 19 in FIG. 4 and its associated camera mechanisms which expose a frame and prepare the camera for the next frame. The blank frame shutter function includes the blank frame shutter 21 and means 22 in FIG. 4. The frame cycle complete function includes the means 20 in FIG. 4 which initiates the frame cycle complete signal to be sent to monitor for counting.

The frame cycle initiate function 41 will actuate a frame cycle of the camera either when the operator depresses the expose switch 28 in FIG. 4; or when the operator depresses switch 37 which simultaneously actuates the blank frame shutter 21; or in response to automatic blank frame circuit 43 which also simultaneously actuates the blank frame shutter 21. When the camera has exposed an image frame, or made a blank frame, and prepared itself for the next frame, a frame cycle complete circuit 44 provides a signal which is returned from the camera to the monitor 17 of FIG. 4 and actuates the frame counter 45 which has both tens digits and units digits sections.

The monitor 17 will previously have been set by the operator by frames per row switches 46 and 47 (control 33 in FIG. 4) so that the frame counter 45 will not count beyond the number of frames per row required by the microfiche card format in use; and it will also have been set by the operator by means of images per row switches 48 and 49 (control 34 in FIG. 4) so that when the images per row required by that particular microfiche card format have been reached, no further image frame exposures will be made and the system will automatically produce the separation frame 11 in FIG. 1 to complete that row up to the number of frames per row required. This will be done by way of the automatic blank frame circuit 43 controlled by the images per row switches 48 and 49. By actuating a new frame cycle, automatic blank frame circuit 43 causes a new frame cycle complete signal to be passed to the frame counter 45 which then automatically counts it. If this does not bring the frame counter 45 up to the number of frames per row preset by switches 46 and 47, further blank frame cycles are initiated automatically until the frame counter 45 does reach that preset number of frames per row.

When the frame counter 45 has reached the number of frames required by the frames per row switches 46 and 47, the latter automatically cause the row counter 50 to advance one row and automatically reset the frames counter 45 to zero for the beginning of a new row. This is indicated by the function 51 in FIG. 5.

A start of row lamp 36 is automatically illuminated when both the tens and units sections of frame counter 45 are at zero, thus indicating to the operator that he is beginning a new row. Lamp 36 is automatically extinguished for all other positions than zero for counter 45.

Row counter 50 controls the row lamps 30 shown in both FIGS. 4 and 5 so that the operator knows at all times which row he is working on. The monitor 17 will have been set by the operator so that the row counter 50 will not count beyond the number of rows required by the microfiche card format in use and this function is controlled by switch 32. When the row counter 50 reaches the number of rows per card preset by switch 32, the automatic row reset circuit 54 will function to reset the row counter 50 to zero or row A, or to "1" (row B), depending on the setting of row mode control switch 35 the function of which has previously been indicated.

Row mode control switch 35 functions through the automatic row advance in function 51.

The manual frame reset switch 38 in FIG. 5 will permit the operator to reset the frame counter 45 whenever desired as when he has made errors. It functions through the automatic frame reset of function 51.

The manual row advance switch 39 will permit the operator to advance the row counter 50 whenever desired as when he has made errors. It functions through the automatic row advance of function 51.

The manual card complete switch 40 will permit the operator to reset the system for a new series of documents to be photographed (a new lead microfiche card) whenever he has reached the end of a previous series without having completely used all frames of the microfiche card on which he is then working. This functions through automatic row reset circuit 54 and automatic blank frame circuit 43 to cause all further frames of the row on which the operator is then working to be completed as blank frames, and to cause resetting of both the frame and row counters 45 and 50.

FIG. 6

FIG. 6 shows a working circuit diagram of the monitor system for implementing FIGS. 4 and 5. The following portions of FIG. 6 are to be noted:

Row counter 50 comprising multipole switches 50A and 50B operate on a common shaft so that each switch may be rotated through ten indicated contact positions by pulses through coil L–3. Such counters are conventional and include digit display mechanisms which are obscured from view in FIG. 4 since their display function is performed by the row lamp indicator 30.

Frame counter 45 comprises two conventional counters with digital display mechanisms as shown in FIG. 4. The first of these counters comprises the multipole switches 45A and 45B for the tens digits and these like the row counter 50 are conventional counters with multipole switches on a common axis and are actuated by the coil L–1. The second counter is for the units digits and comprises the switches 45C and 45D actuated by the coil L–2 and are also conventional counters like row counter 50. These two counters 45 actuate visual indicators 29 in FIG. 4.

The rows per card switch 46 provides the rows per card setting for the rows counter 50.

The frames per row switch 46 provides the frames per row setting for the tens counter 45A while the switch 47 provides the frames per row setting from the units counter 45C.

The images per row switch 48 provides the images per row setting for the tens counter 45A while the switch 49 provides the images per row setting for the units counter 45C.

Power for the monitor 17 is supplied by a 120 volt conventional supply which is connected to the monitor by the switch 26. This actuates the transformer T–1 which by means of the rectifier circuit, including diodes CR 20 and CR 21 and capacitor C–4, supplies a +24 D.C. volt direct voltage to the line indicated. This +24 D.C. volt voltage exists, therefore, between the indicated line and the ground line shown and it is this direct voltage which is used to operate the counting mechanisms for the counting function. The 24 volts A.C. on either side of the midpoint of the secondary of the transformer T–1 will be used to supply the voltage for the reset of the counters. Additionally, half wave 120 volt power is supplied through diode CR 18, capacitor C–3 and resistor R8 to operate the solenoid L–4 of the blank frame shutter mechanism in the camera.

The frame cycle complete signal derived from means 20 function is indicated at the bottom center of FIG. 6 which indicates that this involves the relay K–1 energized by 120 volts from the camera, the camera being supplied by its own source distinct from the 120 volts source actuating the monitor 17.

The frame cycle initiate function is indicated at the bottom center of FIG. 6 which indicates that this involves the relay contacts K3–3 which when closed, closes the frame cycle mechanism 19 in the camera to energize them from the camera's own power source.

The remaining elements in FIG. 6 comprise various switches, diodes, resistors, capacitors, and relays which will be explained as we endeavor to point out the way in which the various functions of the monitor are performed in the circuit diagram of FIG. 6. It will be noted that the relays are shown conventionally in terms of schematic solenoids designated by the letter K followed by a distinguishing numeral. For clarity of the diagram, the contacts actuated by each relay are displaced from the relay but are designated by the same K and distinguishing numeral plus an additional number to designate the contact which the relay actuates. For example, the relay K–1 in the frame cycle complete signal circuit shown at the bottom center of FIG. 6 actuates its contacts K1–1 associated with the relay K–2 shown somewhat above K–1.

It may be explained in connection with all of these relays that the contacts operated by them are designated by three parallel lines. The longer central line represents the movable arm of a switch, while the shorter parallel lines on the left and right halves of the central line represent switch contacts which the movable arm contacts in two alternative positions determined by the state of energization of the associated relay. The diagonal lines drawn through two parallel lines means that the associated relay is in such a state of energization as to interconnect those two parallel lines so as to close the circuit between them. When that relay is actuated to its opposite state of energization, the diagonal line will transfer from left to right, or vice versa, to interconnect the right hand pair of parallel lines and disconnect the left hand pair, or vice versa, thus closing the right hand circuit and opening the left hand circuit, or vice versa. In FIG. 6, all diagonal lines are shown in positions indicating the normal state of the circuit at the initiation of operation.

The manner in which the FIG. 6 operates to perform the functions previously indicated will now be explained.

Frame cycle initiation and completion

A frame cycle is initiated by the operator depressing switch 28 which moves from its normally closed left hand position to its right hand position momentarily after which it returns to its left hand position. This momentarily interconnects relay K–3 between the +24 D.C. volt line and the ground line by way of contacts K1–2 the left hand diagonal line of which indicates that the circuit between the +24 D.C. volt line and the relay K–3 is closed. Actuation of the relay K–3 operates through its contacts K3–3 to active means 19 in the camera to initiate a frame cycle. That is to say, the normally closed right hand contacts of contacts K3–3, as indicated by the diagonal line, are opened and the left hand contacts closed, i.e., the diagonal line will have shifted from right to left in contacts K3–3. Later it returns to the right hand side. The camera's own power source is used in this circuit. Actuation of relay K–3 also similarly shifts the contacts K3–1 to hold relay K–3 energized by connecting it to ground, consequently holding contacts K3–3 in left hand position to maintain the frame cycle circuit in the camera until relay K–3 is de-energized by relay K–1. Relay K–3 remains de-energized until the next actuation of switch 28, or of relay K–5 (automatic Blank Frame), or of relay K–4 (manual Blank Frame).

Upon completion of a frame cycle, a frame cycle complete signal from the camera at 120 volts from the camera power source momentarily energizes relay K–1 which thereupon actuates contacts K1–2 to de-energize relay K–3 and consequently K3–3 to open the frame cycle circuit 19.

Frame counter actuation

Energization of relay K–1 also opens contacts K1–1 to disconnect resistor R–9 from capacitor C–2 and connect capacitor C–2 to relay K–2. The charge on capacitor C–2, which has been built up at +24 D.C. volts through resistor R–9 during camera exposure, thereupon momentarily energizes relay K–2. Upon completion of the pulse to relay K–2, contacts K1–2 automatically reverse to reconnect relay K–3 to +24 D.C. to prepare for the next cycle operation, and contacts K1–1 automatically reverse to recharge capacitor C–2 after relay K–2 has been momentarily energized.

Momentarily energization of relay K–2 shifts contacts K2–1 (see extreme right portion of FIG. 6) to ground the conductor on the extreme right of the FIG. 6 through contacts K7–2. This momentarily energizes coil L–2 from the +24 D.C. volts line through contacts K7–1, resistor R–5, coil L–2, diode CR–12, contacts K7–2, contacts K2–1, to ground. Coil L–2 thereby advances the units counter 45C by one digit.

This process is repeated each time the operator actuates the exposure switch 28 to expose a frame until the counter 45 reaches the images per row setting at which he has set the switch 49 (and 48 if the images per row exceed nine). From there on, the process will continue automatically until the counter 45 reaches the frames per row setting at which the operator has set the switch 47 (and switch 46 if the frames per row exceed nine). This automatic action will be explained later.

If the frames per row setting of switches 47 and 46 is greater than nine, the units counter 45C, 45D will transfer each ten counts to the tens counter 45A, 45B to advance the tens counter once. This is done as follows. When the rotating arm of Switch 45D of the units counter reaches "9," it will be noted that the cathode of diode CR–8 is connected to the anode of diode CR–12. Therefore, upon the next frame cycle actuation and the consequent closing of contacts K2–1 by the frame cycle complete function, the tens counter 45A, 45B is advanced once through contacts K7–1, resistor R–3, coil L–1, diode CR–8, diode CR–12, contacts K7–2 and contacts K2–1 to ground. At the same time the frame units counter advances once to its "0" position because of the circuit previously described.

Images per row, frames per row, and automatic blank frame actuation

In order to bring the frames counters up to the frames per row settings after they have reached the images per row settings, the following automatic circuit is actuated by the images per row switches 48 and 49 when the frame counters have reached the images per row settings. It will be noted that when the frame units counter 45C reaches the images per row setting, its rotating contact arm, which carries a voltage of +24 volts D.C. by virtue of connection to the +24 D.C. volt line, will impose a +24 D.C. voltage on the contact arm of 49 and from there through diode CR–17 to relay K–5, and then through contacts K6–2 to contacts K7–4, through diode CR–15 to the arm of switch 48. Switch 48 is thereby grounded by virtue of connection to the arm of the tens counter 45A if tens counter has reached the images per row setting of switch 48, since the arm of tens counter 45A is connected to the ground line by the conductor shown. Relay K–5 therefore is energized and energizes relay K–3 by closing the contacts K5–3 which initiates a frame cycle in the camera through contacts K3–3 as previously explained. At the same time, the blank frame shutter 21 is actuated by the closing of the lower contacts K5–2 which energizes coil L–4 from the main power line as previously explained, i.e., with half wave 120 volts.

It will be noted that the actuation of relay K–5 closes the contacts K5–1 and K5–4 to hold relay K–5 in the energized condition and thus also keeps closed the contacts K5–2 and K5–3. In this situation, the blank frame shutter 21 remains closed. Also, the exposure frame cycles are automatically repeated by the action of relays K–3 and K–1. That is to say, that when relay K–3 actuates a frame cycle through contacts K3–3, the completion of that frame cycle will produce a frame cycle complete signal which de-energizes relay K–3 through relay K–1 and its contacts K1–2 momentarily. Upon restoration of contact K1–2 a new frame cycle will be initiated. The frame cycles are automatically repeated in this manner producing count pulses to the counter as previously explained, until the number of frame cycles counted has reached the setting of the frames per row switches 46 and 47. Thereupon the row counter 50 will be advanced by relay K–6 in the manner to be explained presently and relay K–6 will de-energize relay K–5 at contacts K6–2 thus terminating automatic cycling of blank frames. At the same time the frame counter will be reset to zero as will be explained.

Diode CR–16 is a noise suppression diode for relay K–5.

Advance of row counter

As previously noted, the arm of the tens frame counter 45A is at ground potential be virtue of connection to the ground line while the arm of the units frame counter 45C is at a +24 D.C. volts by virtue of connection to the +24 D.C. volt line. When the counters 45A and 45C have reached the settings on the frames per row switches 46 and 47, it will be seen that 24 volts is applied across the relay K–6. Relay K–6 thereupon actuates contacts K6–1 to close a circuit for pulsing the rows counter 50 one cycle. This circuit is similar to the circuit through which frame units counter coils L–1 and L–2 are actuated. That is to say the row counter circuit proceeds from the +24 D.C. volt line through the contacts K8–1 to resistor R–1 to the coil L–3 diode through CR–4 to contacts K8–2, through contacts K6–1 and K9–1 to the ground line. Thus the rows 50 counter is pulsed once when the frames counter 45 has reached the frames per row settings. Since the frames counters 45A and 45B will be reset to zero at this point, the relay K–6 will be de-energized in preparation for the next rows count.

While relay K–6 is energized, the automatic blank frame circuit cannot operate because it is opened by contacts K6–2.

Diode CR–14 is a noise suppression diode for relay K–6.

Counter reset

When the frames counter 45 reaches the frames per row setting of switches 46 and 47, the frames counter 45 resets to zero automatically as follows by virtue of the actuation of relay K–6. The energization of relay K–6 closes contacts K6–3 so that relays K–7 and K–7A are energized by connection between the +24 D.C. volts line and ground through contacts K3–2 which is normally closed although open when K–3 is energized. The energization of relay K–7 closes the left hand contacts of K7–3 to hold relay K–7 energized until the next frame exposure energizes relay K–3 to open the left hand contacts of K3–2 and thus deenergize relays K–7 and K–7A.

When relays K–7 and K–7A are energized, 24 volts rectified A.C. are applied for energization of counter coils L–1 and L–2 to reset the frames counter through the following circuits. Energization of relays K–7 and K–7A shifts K7–1 contacts K7–1 (see far right portion of FIG. 6) from the normally closed left hand contact to the right hand contact, thus breaking the connection with the +24 D.C. volt line and establishing connection with the anode of diode CR–19. At the same time contacts K7–2 shift to connect the secondary of transformer T–1 to the conductor shown at the far right.

If the frames tens counter 45A, 45B is at any one of the positions "1" to "8," then coil L–1 is energized with half wave pulses each of which advances the tens counter once until the counter reaches "9." This is through the following circuit: diode CR–19, right hand contacts K7–1, diode CR–5, coil L–1, the rotating common arm of switch 45B, the interconnected terminals "1" to "8" of switch 45B, diode CR–11, contacts K7–2, to transformer T–1. When the rotating arm of switch 45B reaches terminal "9," the coil L–1 is again pulsed once to reset the rotating arm to the "0" terminal by the same circuit except that the circuit proceeds through the "9" terminal and diode CR–7 to contacts K7–2. Reset of the frames tens counter 45A, 45B ceases when the rotating arm of switch 45B reaches the "0" terminal because the reset circuit is then broken.

If the frames units counter 45C, 45D is at any one of the positions "1" to "8," the coil L–2 is energized with half wave pulses each of which advances the units counter once until the counter reaches "9." This is accomplished through the following circuit: diode CR–19, right hand contacts K7–1, diode CR–9, coil L–2, the rotating common arm of switch 45D, the interconnected terminals "1" to "8" of switch 45D, contacts K7–2, to transformer T–1. When the rotating arm of switch 45D reaches terminal "9," the coil L–2 is again pulsed to reset the rotating arm to the "0" terminal by the same circuit except that the circuit proceeds through the "9" terminal and diode CR–11 to contacts K7–2. Reset of the frames units counter ceases when the rotating arm of switch 45D reaches the "0" terminal because the reset circuit is then broken.

Diode CR–6 and resistor R–4 are an arc suppression circuit for coil L–1. Diode CR–10 and resistor R–6 are an arc suppression circuit for coil L–2.

Reset of the rows counter 50 is accomplished as follows: The rotating contact of the left hand switch 50A of the rows counter 50 is connected to the +24 volts D.C. line. When the row counter 50 reaches the rows per card setting of switch 32, relay K–8 is energized because the rotating arm of switch 32 is connected to ground through relay K–8. This causes contacts K8–1 and K8–2 to connect 24 volts AC to the rows counter through the connections designated "X" and "Y." If the rotating contact of right hand switch 50B of the rows counter is on any of the interconnected terminals "1" to "8," then half wave pulses advance the row counter 50 once per pulse until position "9" is reached. This occurs through K8–1, diode CR–1, coil L–3, the rotating arm and the "1" to "8" contacts of switch 50B, to K8–2. When the rotating arm of switch 50B reaches the "9" position, one further pulse resets the counter to "0" through the same circuit except that the connection is through diode CR–3.

The rows counter stops when the arm of the right hand switch 50B reaches zero because the reset circuit is broken.

Diode CR–2 and resistor R–2 constitute a noise suppression circuit for coil L–3.

A delay circuit including capacitor C–1, and resistor R–7 delays de-energization of relay K–8 long enough to permit counter 50 to reset to zero.

Row mode

To avoid confusion, it should be noted that the digital positions 0, 1, 2, 3, 4, 5, 6, 7, 8, 9, of the rows counter switch 50A correspond with the alphabetical row designations A, B, C, D, E, F, G, H, I, J respectively.

Row mode is controlled by switch 35 which is a double pole, double throw, center off type of switch. As shown it is in the center off position. When the switch blades of switch 35 are on the upper two contacts of switch 35, the system is in AA mode, meaning that the rows counter 50 begins with and always returns to "0" or row A after reaching the preset rows per card as determined by 46. When the switch blades of switch 35 are on the lower two contacts of 35, the system is in the BB mode, meaning that the rows counter 50 begins with and always returns to "1" or row B. When the switch blades of 35 are in the center off position, contacting neither the upper or lower contacts, the system is in the BA mode, meaning that the rows counter begins with "1" or row B for the first microfiche card and returns to "0" or row A for subsequent trailer microfiche cards.

The operation is as follows:

In the AA mode, the circuit operates as previously explained; the rows counter 50 always resets to the "0" position. However, the relay K–9 is energized when the rows counter reaches the rows per card setting of switch 32 by virtue of the +24 D.C. volts imposed through the arms of the row counter 50A and switch 32, diode CR–13, and the connection to ground through switches 35 and 28. Since contacts K9–2 are then closed, relay K–9 then remains energized until the next film expose actuation of 28 de-energizes it and opens contacts K9–2. Energization of relay K–9 opens contacts K9–1 preventing erroneous advance of the rows counter beyond "0" (row A) by a delayed pulse from the frames counter which could happen because the row counter reset occurs much faster than the frames counter reset.

In the BB mode, relay K–10 is connected to ground. Thus, when the rows counter is at "0" (row A), relay K–10 is energized by the +24 D.C. volts on the arm of the rows counter switch 50A through switch 32, contacts K11–1, and switch 35 to ground. Relay K–10 thereupon closes the right hand contacts K10–2 to advance the rows counter to "1" (row B), and actuates relay K–11 through contacts K10–1 which de-energizes relay K–10.

Relay K–9 functions in the BB mode as it does in the AA mode by virtue of the switch 35 connections shown.

In the BA mode, as in the AA and BB modes, energization of the relay K–8 upon reaching the rows per card setting of 32 always returns the row counter to row A. For any lead microfiche in the BA mode, the operator may use the row advance control, switch 39, to begin a lead microfiche with row B. However, in the BA mode, if the operator pushes the card complete switches 40A, 40B and 40C, as he would do when he completes a series of documents without having completed any row, then the BA mode will automatically reset to row B for the next lead microfiche. This is because card complete switches 40A, 40B and 40C actuate row reset relay K–8 to reset to row A, and actuate blank frame relay K–5 which, upon completing the row (after K–8 has reset to row A), automatically advances the row counter from row A to row B. This latter advance cannot occur in the AA mode because relay K–9 has prevented such action by opening contacts K9–1. A similar advance from row B to row C in the BB mode cannot occur for the same reason, namely the action of relay K–9 and contacts K9–1.

Relay K–9 is reset by the next actuation of film exposure switch 28 since that breaks the circuit of relay K–9 thus permitting holding contacts K9–2 to open.

Card complete circuit

When the operator completes a group of documents to be photographed before he has reached the end of a microfiche card, he will wish to reset the monitor for a new grouping, leaving the uncompleted row with remaining frames blank. In that case he will depress switch 40. Switch 40 comprises three separate but simultaneously actuated switches 40A, 40B and 40C shown interconnected by dashed line. When these switches are simultaneously actuated, the following actions occur.

Switch 40A energizes relay K–8 with +24 D.C. volts to ground, thus resetting the rows counter 50 to row A as before. In the BB mode, relay K–10 advances the row counter to row B, as before. In the AA and BB modes, relay K–9 prevents any advance beyond row A or B as explained previously.

Switches 40B and 40C energize relay K–5 by connecting it between the +24 D.C. volt line and ground, thus completing the row in blank frames and resetting the frames counter to zero as before. This advances the row counter to row B in the BA mode as above indicated, since in the BA mode relay K–9 does not function to prevent row advance.

Blank frame switch

Should the operator at any time desire to make a blank frame, he may actuate switch 37 which interconnects relay K–4 between the +24 D.C. volt line and ground through contacts K1–3. This closes contacts K4–1 to actuate solenoid L–4 and thereby the blank frame shutter 21, and contacts K4–2 to hold relay K–4 energized. It also closes contacts K4–3 to actuate relay K–3 and thereby initiate a frame cycle as before. The returning frame cycle complete signal de-energizes relay K–4 by opening contacts K1–3 momentarily through relay K–1.

Frame reset switch

Should the operator at any time desire to reset the frames in a row, for example to correct errors by repeating a row, he may actuate switch 38 which will energize relays K–7 and K–7A by connecting them between the +24 D.C. volt line and ground by way of contacts K3–2. This resets the frames counter to zero as before. This procedure might be useful where the operator has erroneously photographed some documentary record, as by photographing it twice. He might then suitably indicate that that row is to be discarded as by photographing a suitable notice to that effect. Then, he may reset the frames counter by switch 38 and the rows counter by switch 39 so that he may rephotograph the row correctly.

Row advance switch 39

Should the operator at any time desire to advance the rows counter as for correcting errors as just explained, he may actuate switch 39 which will energize the rows center coil L–3 from the +24 D.C. volt as before and advance the counter by one row. Each actuation of switch 39 advances the counter by one. Thus the operator may by repeated actuation return the counter to any desired row within the rows per card setting of switch 32.

Start of row lamp 36

It will be noted that the start of row lamp 36 is interconnected between the zero positions of tens frame counter 45A and units frame counter 45C and so illuminates when they are both on zero, thus informing the operator that he is beginning a row, this is because of the 24 D.C. difference between their arms. The lamp 36 extinguishes when either counter moves from zero.

Row indicator lamps

Row indicator lamps 30 of FIGS. 4 and 5 are shown at the extreme left of FIG. 6. All are connected on one side to ground, and on the other to their respective terminals of row counter switch 50A.

The invention has been described in detail with reference to preferred embodiments thereof, but it will be understood that variations and modifications can be effected within the spirit and scope of the invention as described hereinabove and as defined in the appended claims.

We claim:

1. Apparatus for monitoring and controlling the recording of images on successive frames of an extended length of a film as the film is passed in successive frame cycles through a camera, the length of the film to be used in subsequent formation of a microfiche of selected format having a preselected number of rows and a preselected number of image frames in each row, the image frames being recorded on the film in successive groups separated by at least one separation frame, the number of images frames per group corresponding to the preselected number of image frames per row in the selected microfiche format, the number of image frames per group plus the number of separation frames between any two groups corresponding to the number of total frames per row in the selected microfiche format and the number of groups corresponding to the number of rows per microfiche of the selected microfiche format, said apparatus comprising:

means for actuating frame cycles of the camera;

a frame counter responsive to the actuation of successive frame cycles of the camera for counting frames cycled up to and including the number of total frames per row selected according to the desired microfiche format and for successively repeating such counting for successive rows up to and including the number of rows selected according to the desired microfiche format;

an image-frames-per-row control for variably setting the image-frames-per-row count of said frame counter to enable said apparatus to selectively accommodate microfiche formats of different image-frames-per-row counts;

a total-frames-per-row control for variably setting the total-frames-per-row count of said frame counter of the preselected number of image frames to enable said apparatus to selectively accommodate microfiche formats of different total-frames-per-row counts;

a row counter responsive to said frame counter for counting rows as said frame counter completes each row; and a rows-per-microfiche control for variably setting the rows-per-microfiche count of said row counter at the preselected number of rows to enable said apparatus to selectively accommodate microfiche formats of different rows-per-microfiche counts.

2. The invention defined in claim 1 in which said row counter is responsive to said frame counter through said total-frames-per-row control for counting rows as said frame counter completes counting the preselected number of image frames per row.

3. The invention defined in claim 1 including means responsive to said total frames-per-row control for resetting said frame counter when said frame counter has counted a number of frames equal to the total-frames-per-row setting of said total-frames-per-row control.

4. The invention defined in claim 1 including means responsive to said rows-per-microfiche control for resetting said row counter when said row counter has counted a number of rows equal to the rows-per-microfiche setting of said rows-per-microfiche control.

5. The invention defined in claim 1 including means responsive to said image-frames-per-row control for actuating frame cycles of the camera after said frame counter has counted a number of frames cycled equal to the image-frames-per-row setting of said image-frames-per-row control and continuing to actuate the frame cycles of the camera until said frame counter has counted a number of frames equal to the total-frames-per-row setting of said total frames-per-row control.

6. The invention defined in claim 5 including means responsive to said total-frames-per-row control for advancing said row counter and resetting said frame counter when said frame counter has counted a number of frames equal to the total-frames-per-row setting of said total-frames-per-row control.

7. The invention defined in claim 5 including:

means for preventing recording frame images on the film; and means responsive to said image-frames-per-row control for actuating said preventing means during the continuing actuation of the frame cycles of the camera.

8. The invention defined in claim 1 including:

means for preventing recording on the film; and manually operable means for simultaneously actuating a frame cycle of the camera and said recording preventing means to produce a blank frame.

9. The invention defined in claim 1 including manually operable means for resetting said frame counter.

10. The invention defined in claim 1 including manually operable means for advancing said row counter.

11. The invention defined in claim 1 including:

means responsive to said frame counter for actuating said row counter; and means for manually actuating said automatic actuating means to selectively advance said row counter.

12. The invention defined in claim 1 including means responsive to said frame counter for indicating the number of image frames recorded in the particular row being recorded.

13. The invention defined in claim 1 including means responsive to said frame counter for indicating the row being recorded in a particular microfiche format.

14. The invention defined in claim 1 including:

a manually operable control means for resetting said frame and row counters for the beginning of a new microfiche from any frame position of the preceding microfiche.

15. The invention defined in claim 5 including:

first means responsive to said total-frames-per-row-control for resetting said frame counter when said frame counter has counted a number of frames equal to the total-frames-per-row setting of said total-frames-per-row control;

second means responsive to said rows-per-microfiche control for resetting said row counter when said row counter has counted a number of rows equal to the rows-per-microfiche setting of said rows-per-microfiche control; and a manually operable microfiche complete control for actuating said second means for resetting said row counter and for actuating said first means for resetting said frame counter to enable the beginning of a new microfiche from any frame position of the preceding microfiche.

16. The invention defined in claim 4 including:

a row mode control for controlling the row in the selected microfiche format to which said row counter resets.

17. The invention defined in claim 4 including:

a row mode control for selectively controlling said resetting means to operate in a first mode to reset said row counter to indicate that the image frames of the first row of the format are being recorded or in a second mode to reset said row counter to indicate that the image frames of the second row of the format are being recorded.

18. The invention defined in claim 1 including row indicator lamps actuated by said row counter.

19. Apparatus for controlling and monitoring the operation of a recording device in: (1) recording frames of information on a strip of recording medium and (2) advancing the strip of recording medium to provide a microfiche card with a format comprising a first preselected number of rows each having a second preselected number of frames thereon, said apparatus comprising:

means for actuating said recording device to effect a frame cycle including the recording and advance of a frame of information on said strip of recording medium;

a frames-per-row-counter responsive to successive frame cycles of the recording device for counting frames cycled up to the second preselected number and for successively repeating such counting for successive rows:

a frames-per-row-control for variably setting the second preselected number on said frames per row counter so that it can accommodate microfiche card formats requiring different number of frames per row;

a rows-per-card counter responsive to said frames-per-row-counter for counting rows completed by said frames-per-row-counter up to the first preselected number and for successively repeating such counting for successive cards; and a rows-per-card control for variably setting the first preselected number of said rows per card counter so that it can accommodate microfiche formats requiring different number of rows per card.

20. Apparatus defined in claim 19 further including means for effecting a selectable predetermined positioning of the recording medium without information being recorded thereon.

21. Apparatus defined in claim 20 further including means responsive to the number of frames recorded on the strip of recording medium for actuating said medium positioning means.

22. Apparatus defined in claim 21 wherein said actuating includes means for counting frames recorded on the strip of recording media.

23. Apparatus defined in claim 20 further including second means for actuating said positioning means independent of said first mentioned actuating means.

24. Indicator and control apparatus for use with a camera device for successively recording images onto a strip of recording medium in a plurality of groups having a first pre-selected number of images, and having means for effecting successive image recording cycles, which image recording cycles include the positioning of the strip for the next successive exposure, said apparatus comprising:

first means for actuating an image recording cycle of the camera device, and second means responsive to the actuation of successive image recording cycles for counting and providing a manifestation of the number of image recording cycle actuations up to the first preselected number and for successively repeating such counting and providing a manifestation of the number of images for each successive group of images.

25. The invention as claimed in claim 24, including third means responsive to the manifestation of said second means of the preselected number of image recording cycle actuation, for counting and providing a manifestation of a number of groups of images that have been recorded by the camera device, up to a second preselected number of groups.

26. The invention defined as in claim 24 further including first control means for variably setting the first preselected number of said second means; and second control means for variably setting the second preselected number of said third means.

27. Indicator and control apparatus for use with a camera device for successively recording images on a strip of a recording medium in a plurality of groups, the groups having a first preselected number of images and being separated from each other by a predetermined distance, the camera device including means for effecting successive image cycles, which cycles include the positioning of the strip for the next successive exposure, said apparatus comprising:

first means for actuating an image recording cycle of the camera device;

second means responsive to the actuation of successive image recording cycles for counting and providing a manifestation of the number of image cycle actuations up to the first preselected number and for successively repeating such counting and providing a manifestation of the number of image cycle actuations within each successive group of images; and third means responsive to the manifestation of said second means of an image count of the first preselected number, for actuating said first means to separate successive groups by the predetermined distance.

28. Apparatus as claimed in claim 27, wherein there is included fourth means responsive to the manifestation of said second means of the first preselected number of image cycle actuations, for counting the number of and for successively repeating such counting and providing a manifestation for successive groups.

29. Apparatus as claimed in claim 28, wherein there is further included first control means for variably setting the first preselected number of images per group on said second means; and second control means for variably setting a second preselected number of groups on said fourth means.

30. Apparatus as claimed in claim 28 wherein there is further included first resetting means responsive to said third means for preparing said second means for successive counting and providing a manifestation of the number of images within the next group of images.

31. Apparatus as claimed in claim 30, wherein there is included second resetting means responsive to said second control means for preparing said fourth means when said fourth means has counted a number of groups equal to the second preselected number, for successively counting the next set of groups of images.

32. Indicator and control apparatus for use with a camera device for successively recording images onto frames of a strip of recording medium to provide a microfiche card of a format comprising a plurality of rows, the rows each having a first preselected number of images, the camera device including means for effecting successive frame cycles, which cycles include the advancing of the strip to position the next frame of the strip for exposure, said apparatus comprising:

(a) first means for actuating a frame cycle of the camera device;

(b) first counting means responsive to the operation of said first means to actuate the frame cycle, for counting and providing a manifestation of a number of frames up to a second preselected number and for successively repeating such counting and providing a manifestation of the number of frames for successive rows of the format;

(c) first control means for variably setting the second preselected number of said first counting means;

(d) second counting means responsive to the manifestation of said first counting means of a frame count equal to the second preselected number, for counting and providing a manifestation of the number of rows up to a third preselected number and for successively repeating such counting and providing a manifestation of the number of rows for successive microfiche card; and (e) second control means for variably setting the third preselected number of said second counting means.

33. Apparatus as claimed in claim 32, wherein there is included spacing means responsive to the manifestation of said first counting means of a frame count of the first preselected number, for actuating said first means for actuating to thereby separate the successive rows by a predetermined distance.

34. Apparatus as claimed in claim 32, wherein there is included third control means operatively associated with said first counting means for setting the first preselected number thereon; and spacing means responsive to said third control means for actuating said first means for actuating when said first counting means has provided a manifestation of a number of frames equal to the first preselected number, and continuing to actuate said first means for actuating until said first counting means has provided a manifestation of a number of frames equal to the second preselected number.

35. Apparatus as claimed in claim 32, wherein there is included first resetting means responsive to said first control means for preparing said first counting means for counting and providing a manifestation of the number of frames for the next successive row, when said first counting means has provided a manifestation indicative of a frame count equal to the second preselected number.

36. Apparatus as claimed in claim 35, wherein there is included second resetting means responsive to said second control means for preparing said second counting means for counting and providing a manifestation of the number of rows of the next microfiche card, when said second counting means has provided a manifestation indicative of a row count equal to the third preselected number.

37. Apparatus as claimed in claim 32, wherein there is included means for preventing the exposure of the strip of recording medium during the actuation of the means for effecting successive frame cycles; third control means operatively associated with said first counting means for setting thereon the first preselected number; and circuit means responsive to said third control means for actuating said preventing means and said first means for actuating when said first counting means has provided a manifestation of a frame count equal to the first preselected number and continuing to actuate said preventing means and said first means for actuating until said first counting means provides a manifestation of a frame count equal to the second preselected number.

38. Apparatus as claimed in claim 32, wherein there is included means associated with the camera device for preventing the exposure of the strip of recording medium during the actuation of the means for effecting successive frame cycles; and manually operable means for simultaneously actuating said first means for actuating and said means for preventing the exposure to thereby produce a blank frame on the strip of recording medium.

39. Apparatus as claimed in claim 32, wherein there is included manually operable means for advancing the count of said first counting means until said first counting means provides a manifestation of a number of frames equal to the second preselected number as set by said first control means.

40. Apparatus as claimed in claim 32, wherein there is included manually operable means for advancing said second counting means until said second counting means provides a manifestation of a row count equal to the third selected number as set by said second control means.

41. Apparatus as claimed in claim 32, wherein there is included means responsive to said first and second counting means for visibly indicating the row and the frame within the row of the image being exposed onto the strip of recording medium.

42. Apparatus as claimed in claim 32, wherein there is included control means responsive to said second counting means when said second counting means has provided a manifestation of a row count equal to the third preselected number as set by said second control means, for resetting said second counting means to provide a manifestation to indicate that the second row of images is being exposed.

References Cited

UNITED STATES PATENTS

| | | | |
|---|---|---|---|
| 2,763,182 | 9/1956 | Urban et al. | 355—54 |
| 3,261,259 | 7/1966 | Baptie et al. | 95—37X |

JOHN M. HORAN, Primary Examiner

R. A. WINTERCORN, Assistant Examiner

U.S. Cl. X.R.

95—37

PO-1050
(5/69)

UNITED STATES PATENT OFFICE
CERTIFICATE OF CORRECTION

Patent No. 3,558,226 Dated January 26, 1971

Inventor(s) Dixon Riggs and David T. Peerson

It is certified that error appears in the above-identified patent and that said Letters Patent are hereby corrected as shown below:

Column 14 line 24 - delete "a" before "film"
line 25 - delete "the" before "film"
Column 16 line 19 - before "strip" delete Said" and insert --the--.

Signed and sealed this 21st day of December 1971.

(SEAL)
Attest:

EDWARD M.FLETCHER,JR.
Attesting Officer

ROBERT GOTTSCHALK
Acting Commissioner of Patents